(12) United States Patent
Ma et al.

(10) Patent No.: US 11,733,831 B2
(45) Date of Patent: Aug. 22, 2023

(54) DEVICES AND METHODS OF INTELLIGENT INTERACTION, AND STORAGE MEDIA

(71) Applicant: BOE Technology Group Co., Ltd., Beijing (CN)

(72) Inventors: Huiguang Ma, Beijing (CN); Liping Lei, Beijing (CN); Yonggui Yang, Beijing (CN); Hao Fang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 87 days.

(21) Appl. No.: 17/213,372

(22) Filed: Mar. 26, 2021

(65) Prior Publication Data
US 2022/0011909 A1   Jan. 13, 2022

(30) Foreign Application Priority Data
Jul. 8, 2020   (CN) .......................... 202010653265.7

(51) Int. Cl.
*G06F 3/0482* (2013.01)
*G06F 3/04883* (2022.01)
*H04L 67/06* (2022.01)

(52) U.S. Cl.
CPC ........ *G06F 3/0482* (2013.01); *G06F 3/04883* (2013.01); *H04L 67/06* (2013.01)

(58) Field of Classification Search
CPC .. G06F 3/0482; G06F 3/04883; G06F 3/0481; G06F 3/04847; G06F 16/168; H04L 67/06; H04L 67/36
See application file for complete search history.

(56) References Cited

U.S. PATENT DOCUMENTS

2007/0083825 A1*  4/2007  Chaudhri .............. G06F 3/0481
                                                              715/788
2010/0277635 A1* 11/2010  Kim ................... H04N 1/00442
                                                              348/E5.022
(Continued)

FOREIGN PATENT DOCUMENTS

CN         101286952 A      10/2008
CN         105549819 A       5/2016
(Continued)

OTHER PUBLICATIONS

CN202010653265.7 First Office Action.
(Continued)

*Primary Examiner* — Angie Badawi
(74) *Attorney, Agent, or Firm* — Ipro, PLLC

(57) ABSTRACT

The present disclosure provides a device and method of intelligent interaction, and a storage medium. The device includes a touch-sensitive display, and a processor coupled to the touch-sensitive display and configured to: display an on-top floating window on the touch-sensitive display, wherein the on-top floating window is a first-level menu; display a second-level menu of the on-top floating window upon receiving a media file transfer message from a network side, wherein the second-level menu includes a cancel icon that is configured to stop downloading a media file or stop pushing a downloaded media file; and stop downloading the media file or stop pushing the downloaded media file in response to a user triggering the cancel icon through the touch-sensitive display.

19 Claims, 9 Drawing Sheets

(56) References Cited

U.S. PATENT DOCUMENTS

| | | |
|---|---|---|
| 2014/0040734 A1 | 2/2014 | Li et al. |
| 2015/0031324 A1* | 1/2015 | Zentner ............... H04W 4/14 |
| | | 455/404.1 |
| 2015/0033125 A1* | 1/2015 | Kang ................... G06F 3/0485 |
| | | 715/719 |
| 2015/0363102 A1 | 12/2015 | Seymour et al. |
| 2017/0109122 A1 | 4/2017 | Schmidt et al. |
| 2017/0372678 A1* | 12/2017 | Ying ................. G06F 3/04883 |
| 2018/0150207 A1* | 5/2018 | Drappeau ........... G06F 3/04845 |
| 2018/0181381 A1* | 6/2018 | Michaely ............... G06F 9/453 |
| 2021/0064191 A1* | 3/2021 | Liao ...................... G06F 3/1454 |
| 2021/0120073 A1 | 4/2021 | Qu et al. |
| 2021/0191741 A1* | 6/2021 | Li ....................... G06F 3/04845 |
| 2021/0397309 A1* | 12/2021 | Meng ................... G06F 3/0486 |

FOREIGN PATENT DOCUMENTS

| | | |
|---|---|---|
| CN | 107291356 A | 10/2017 |
| CN | 107809527 A | 3/2018 |
| CN | 107908386 A | 4/2018 |
| CN | 108205403 A | 6/2018 |
| CN | 109343755 A | 2/2019 |
| CN | 110225292 A | 9/2019 |
| CN | 111124210 A | 5/2020 |
| CN | 111309205 A | 6/2020 |
| CN | 111309218 A | 6/2020 |

OTHER PUBLICATIONS

Research on Human-Computer Interaction Design of Smart Projector.

Research On the Design of Online Education Application Interface Based On Dual Interactive Internet TV.

X2022233JZ Search Report issued by Patent Examination Cooperation Jiangsu.

* cited by examiner

DEVICES AND METHODS OF INTELLIGENT INTERACTION, AND STORAGE MEDIA

CROSS-REFERENCE TO RELATED APPLICATIONS

The present disclosure claims a priority of the Chinese patent application No. 202010653265.7 filed on Jul. 8, 2020 and entitled "DEVICES AND METHODS OF INTELLIGENT INTERACTION, AND STORAGE MEDIA", which is incorporated herein by reference in its entirety.

TECHNICAL FIELD

The present disclosure relates to the field of data processing technology, and in particular to a device and method of intelligent interaction, and a storage medium.

BACKGROUND

At present, a variety of devices for intelligent interaction have been used in daily office. Taking a conference room as an example, a device for intelligent interaction such as an electronic whiteboard with a large size (such as 55 to 110 inches, or even larger) is often provided in the conference room. Files may be displayed through the device for intelligent interaction, which is convenient for participants to watch, discuss, etc.

SUMMARY

The present disclosure provides a device and method of intelligent interaction, and a storage medium.

In a first aspect, embodiments of the present disclosure provide a device for intelligent interaction, comprising a touch-sensitive display, and a processor coupled to the touch-sensitive display and configured to:

display an on-top floating window on the touch-sensitive display, wherein the on-top floating window is a first-level menu;

display a second-level menu of the on-top floating window upon receiving a media file transfer message from a network side, wherein the second-level menu comprises a cancel icon that is configured to stop downloading a media file or stop pushing a downloaded media file; and stop downloading the media file or stop pushing the downloaded media file in response to a user triggering the cancel icon through the touch-sensitive display.

Optionally, the processor is further configured to display the second-level menu of the on-top floating window in response to the user triggering the on-top floating window.

Optionally, the second-level menu further comprises a hide icon, and the processor is further configured to display the hide icon while the cancel icon is displayed in the second-level menu of the on-top floating window, and to hide the second-level menu or hide the on-top floating window in response to the user triggering the hide icon.

Optionally, the processor is further configured to display the on-top floating window in a second size at a second position of the touch-sensitive display.

Optionally, the processor is further configured to display the on-top floating window in a first size at a first position of the touch-sensitive display, before displaying the on-top floating window in the second size at the second position of the touch-sensitive display.

Optionally, the processor is further configured to shift the on-top floating window at the first position to the second position and display the on-top floating window in the second size after receiving the media file transfer message and before displaying the cancel icon on the on-top floating window, wherein the first position is different from the second position, and the first size is smaller than the second size.

Optionally, the processor is further configured to display prompt information in the on-top floating window in response to the media file being in a downloading state, after the on-top floating window in the second size is displayed at the second position of the touch-sensitive display, wherein the prompt information comprises at least one of a file type of the media file, a download progress, a user identification of a pushing user, or network information during download.

Optionally, the processor is further configured to acquire position information of the user, and to adjust a position of the on-top floating window in the second size according to the position information, such that a distance between the on-top floating window and the user is minimized.

Optionally, the processor is further configured to push the downloaded media file on the touch-sensitive display for display in response to the user performing no operation on the cancel icon; and to shift the on-top floating window in the second size displayed at the second position to the first position for display in the first size.

In a second aspect, the embodiments of the present disclosure provide a method of intelligent interaction, which is executable by a processor in a device for intelligent interaction comprising a touch-sensitive display, the method comprising:

displaying an on-top floating window on the touch-sensitive display, wherein the on-top floating window is a first-level menu;

displaying a second-level menu of the on-top floating window upon receiving a media file transfer message from a network side, wherein the second-level menu comprises a cancel icon that is configured to stop downloading a media file or stop pushing a downloaded media file; and stopping downloading the media file or stopping pushing the downloaded media file in response to a user triggering the cancel icon through the touch-sensitive display.

Optionally, the method further comprises:

detecting a triggering operation on the on-top floating window by the user; and displaying the second-level menu of the on-top floating window in response to detecting the triggering operation on the on-top floating window by the user.

Optionally, the second-level menu further comprises a hide icon, and the method further comprises:

displaying the hide icon while the cancel icon is displayed in the second-level menu of the on-top floating window; and hiding the second-level menu or hiding the on-top floating window in response to the user triggering the hide icon.

Optionally, the method further comprises:

displaying the on-top floating window in a second size at a second position of the touch-sensitive display.

Optionally, the method further comprises:

displaying the on-top floating window in a first size at a first position of the touch-sensitive display, before displaying the on-top floating window in the second size at the second position of the touch-sensitive display.

Optionally, the method further comprises:

shifting the on-top floating window at the first position to the second position and displaying the on-top floating window in the second size after receiving the media file transfer message and before displaying the cancel icon on the on-top floating window, wherein the first position is different from the second position, and the first size is smaller than the second size.

Optionally, after the on-top floating window in the second size is displayed at the second position of the touch-sensitive display, the method further comprises:

displaying prompt information in the on-top floating window in response to the media file being in a downloading state, wherein the prompt information comprises at least one of a file type of the media file, a download progress, a user identification of a pushing user, or network information during download.

Optionally, the method further comprises:

acquiring position information of the user, and adjusting a position of the on-top floating window in the second size according to the position information, such that a distance between the on-top floating window and the user is minimized.

Optionally, the method further comprises:

pushing the downloaded media file on the touch-sensitive display for display in response to the user performing no operation on the cancel icon; and shifting the on-top floating window in the second size displayed at the second position to the first position for display in the first size.

In a third aspect, the embodiments of the present disclosure provide a non-transitory computer-readable storage medium having a computer executable program stored therein, wherein the computer executable program, when executed by a processor, causes the processor to perform the method of intelligent interaction of any of the second aspect.

It should be understood that the above general description and the following detailed description are merely exemplary and explanatory, and are not intended to limit the present disclosure.

BRIEF DESCRIPTION OF DRAWINGS

The drawings herein, which are incorporated into the specification and constitute a part of the specification, illustrate embodiments in accordance with the present disclosure, and are used together with the specification to explain the principle of the present disclosure.

FIG. 12A illustrates a display state of the on-top floating window on a touch-sensitive display, and FIG. 12B illustrates an enlarged view of the on-top floating window in FIG. 12A, in which a portion of the on-top floating window is displayed on the display and the other portion is hidden.

FIG. 13A illustrates a display state of the on-top floating window on a touch-sensitive display, and FIG. 13B illustrates an enlarged view of the on-top floating window in FIG. 13A.

FIG. 14A illustrates a state in which a cancel icon and a hide icon in the second-level menu of an on-top floating window are displayed side by side with the on-top floating window, and FIG. 14B illustrates an enlarged view of the on-top floating window, the cancel icon and the hide icon in FIG. 14A.

DETAILED DESCRIPTION

Figure 1:
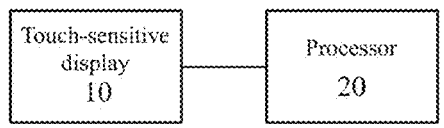
FIG. 1 is a block diagram illustrating a device for intelligent interaction according to an embodiment of the present disclosure.

Exemplary embodiments will be described in detail herein, and examples thereof are illustrated in the drawings. When the following description refers to the drawings, the same numbers in different drawings indicate the same or similar elements, unless otherwise indicated. The implementations described in the following exemplary embodiments do not represent all implementations in accordance with the present disclosure. Rather, they are merely examples of apparatuses and methods in accordance with some aspects of the present disclosure as detailed in the appended claims.

Files displayed on a device for intelligent interaction usually come from a host computer or a server. After a file is transferred, the device may remind a user of its storage location. The transferred file may be opened by the user and displayed on the device, or may be automatically displayed on the device. Taking the transferred file being automatically displayed on the device as an example, a file push may be initiated by other users and the user of the device may not be able to predict contents of the transferred file, causing confidentiality or a display process of the file to be uncontrollable, which reduces user experience.

An embodiment of the present disclosure provides a device for intelligent interaction. Referring to FIG. 1, the device for intelligent interaction includes a touch-sensitive display 10 and a processor 20 coupled to the touch-sensitive display 10.

The processor 20 is configured to display an on-top floating window on the touch-sensitive display 10, where the on-top floating window is a first-level menu.

The processor 20 is further configured to display a second-level menu of the on-top floating window upon receiving a media file transfer message from a network side, where the second-level menu includes a cancel icon that is configured to stop downloading a media file or stop pushing a downloaded media file.

The processor 20 is further configured to stop downloading the media file or stop pushing the downloaded media file in response to a user triggering the cancel icon through the touch-sensitive display 10.

In an embodiment, the touch-sensitive display 10 and the processor 20 may be coupled through a cache chip. For example, the processor 20 may send data to the cache chip, and the cache chip may forward the data to the touch-sensitive display 10, thereby controlling the touch-sensitive display 10 to display contents.

Figure 2:
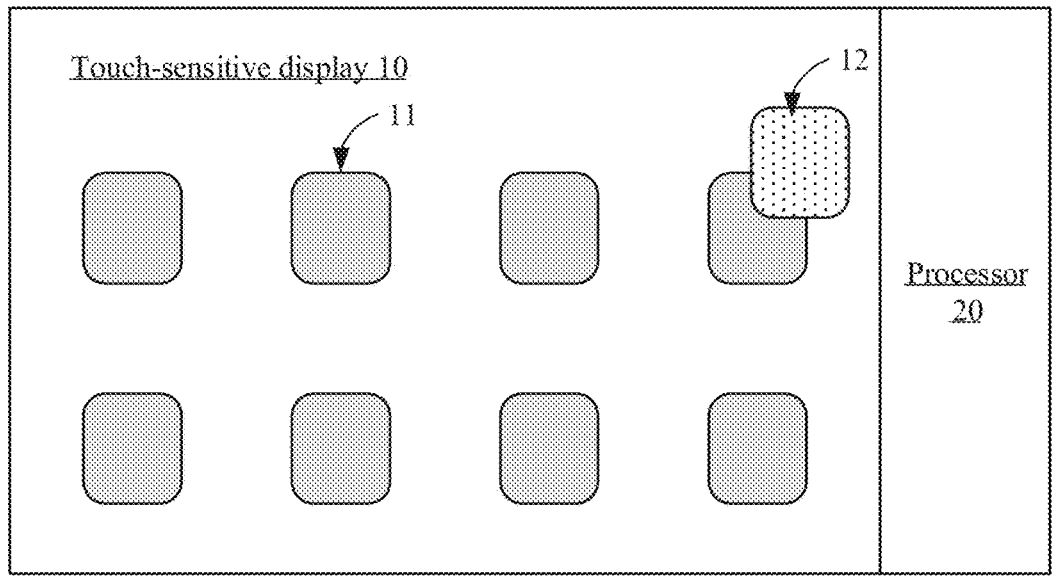
FIG. 2 is a schematic diagram illustrating an on-top floating window according to an embodiment of the present disclosure.

In an embodiment, an operation interface that is backed up at the last shutdown of the device for intelligent interaction or that is preset may be displayed during startup of the device. The operation interface may include an icon 11 of an application installed in the device and an on-top floating window 12. The on-top floating window 12 may have the first size (which is adjustable), and may be displayed at the first position (which is adjustable) on the touch-sensitive display 10, as shown in FIG. 2. A ratio of the first size to a size of the touch-sensitive display 10 may be between 1:1000 and 1:4000, or the first size may be the same as sizes of icons of other applications displayed, which may be set according to specific scenarios, and is not limited herein.

Figure 3:
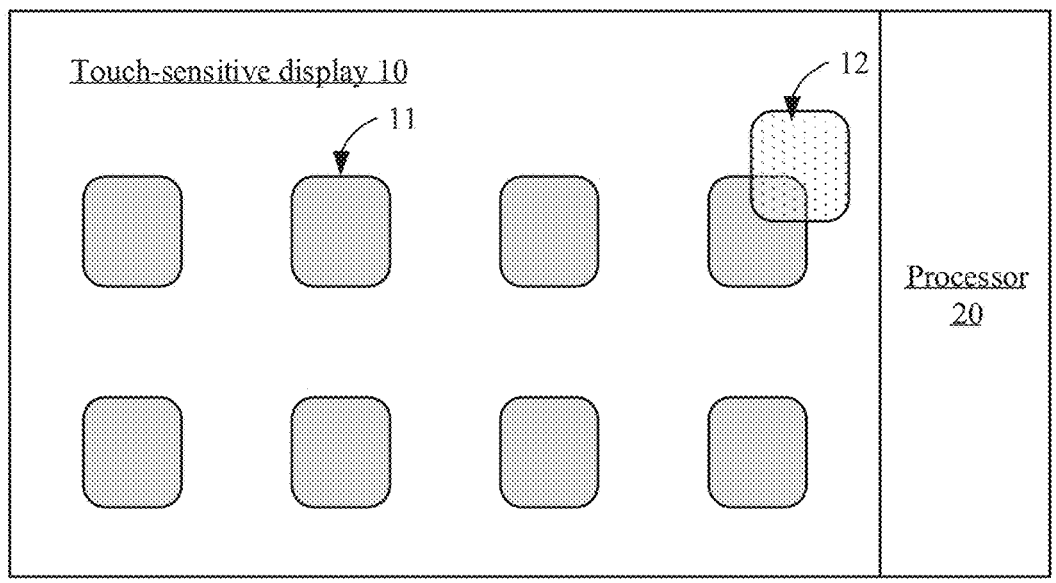
FIG. 3 is a schematic diagram illustrating an on-top floating window according to another embodiment of the present disclosure.

It should be noted that the term "on-top" means that the floating window may cover the application icon 11 during a display process, such that the floating window and contents in the floating window may be displayed in an overlapping area of the floating window and the application icon. However, in order to eliminate or reduce an influence of the on-top floating window 12 on contents displayed on the touch-sensitive display 10, a transparency of the on-top floating window 12 may be preset, so that the user may see the contents displayed on the touch-sensitive display 10 through the on-top floating window 12, as shown in FIG. 3. For the sake of description, the subsequent embodiments will be described in the case that the on-top floating window 12 is opaque (a value of the transparency is 0).

Figure 4:
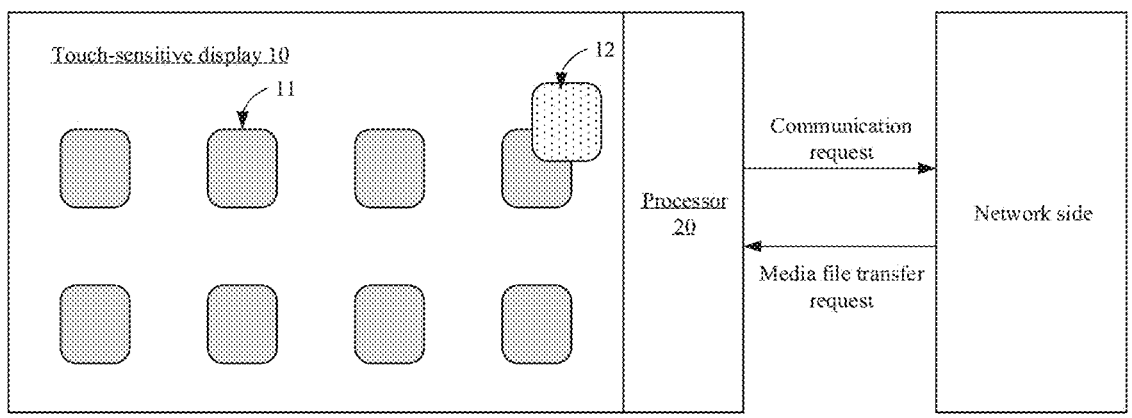
FIG. 4 is a schematic diagram illustrating communication between a device for intelligent interaction and a network side according to an embodiment of the present disclosure.

In an embodiment, referring to FIG. 4, the device for intelligent interaction, after powered on, may be communicated with a network side, for example, may send a communication request to the network side. The network side may include a host computer, a server, a mobile terminal, or the like. The network side, after receiving the communication request from the device for intelligent interaction, may send a media file transfer message to the device for intelligent interaction. In an implementation, the media file transfer message may include at least one of a file type of the media file, a download progress, a user identification of a pushing user, or network information during download. However, those skilled in the art may add information such as a file name of the media file, keywords in the file, a size of the file, a current network speed, and an estimated transfer time to the media file transfer message according to specific scenarios, which is not limited herein.

Figure 5:
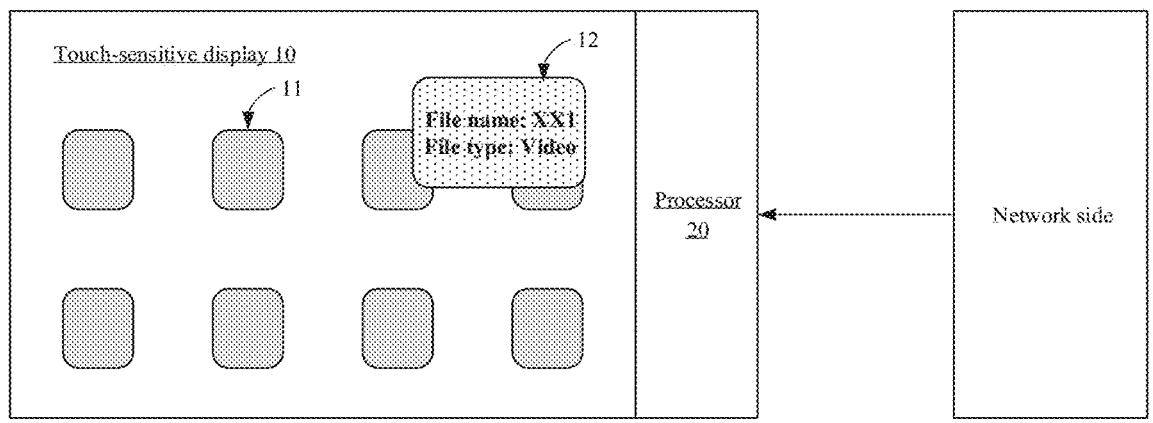
FIG. 5 is a schematic diagram illustrating display of prompt information in an enlarged on-top floating window according to an embodiment of the present disclosure.

In an embodiment, after the device for intelligent interaction receives the media file transfer message, the processor 20 may be further configured to enlarge the on-top floating window in the first size to the second size, and display it at the second position on the touch-sensitive display 10 which is different from the first position, as shown in FIG. 5. A ratio of the second size to the size of the touch-sensitive display 10 may be ⅟1000 to ⅟500, or the second size may be several times (for example, 2 times) of the sizes of the icons of other applications displayed, which may be set according to specific scenarios. By enlarging the size of the on-top floating window 12, the user may feel a change in the size of the on-top floating window 12, thereby achieving an effect of reminding the user. However, the processor 20 may enlarge the on-top floating window from the first size to the second size and display it at the second position, after detecting a triggering operation on the on-top floating window by the user, or after receiving the media file transfer message, or after displaying the on-top floating window in the first size for a period of time (for example, 0.5-5 seconds, which is adjustable). For example, the on-top floating window in the first size is displayed at the first position after the device for intelligent interaction is powered on, and after the media file transfer message is received, the on-top floating window may be enlarged to the second size and displayed at the second position, then the second-level menu may be displayed, which may be set according to specific scenarios, and is not limited herein.

Meanwhile, when the media file is in a downloading state, the processor 20 may be further configured to display prompt information in the enlarged on-top floating window 12, and the prompt information may include at least one of a file type of the media file corresponding to the media file transfer message, a download progress, a user identification of a pushing user, or network information during download. Referring to FIG. 5, the prompt information displayed in the enlarged on-top floating window 12 may include "File name: XX1" and "File type: Video". In this way, this embodiment may remind the user that there is a media file to be transferred.

In an embodiment, the processor 20 may download the media file after the device for intelligent interaction receives the media file transfer message. After the media file is downloaded, the processor 20 may enlarge the on-top floating window from the first size to the second size and display it at the second position of the touch-sensitive display 10, as shown in FIG. 5, to remind the user that the media file has been downloaded and is to be pushed on the touch-sensitive display 10 for display.

Figure 6:
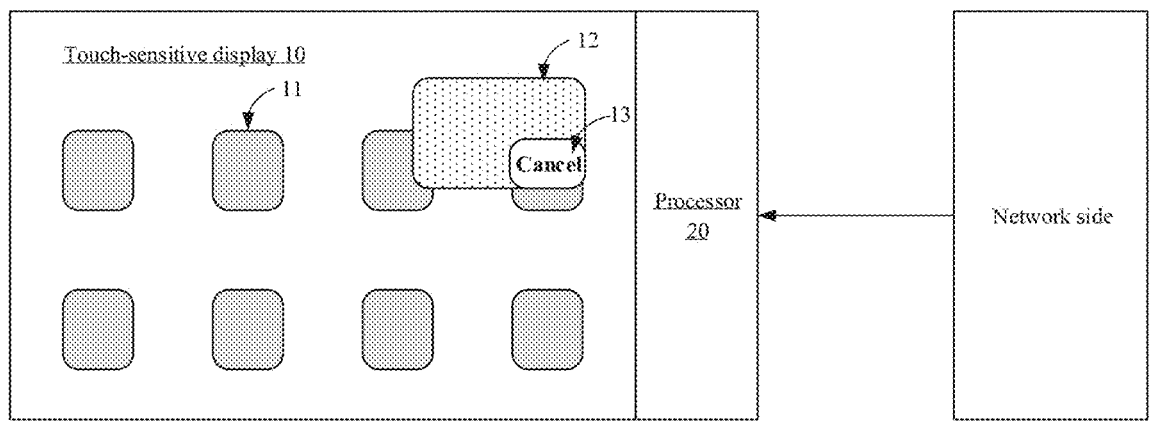
FIG. 6 is a schematic diagram illustrating display of a cancel icon according to an embodiment of the present disclosure.

In an embodiment, as shown in FIG. 6, a cancel icon 13 may be displayed in the on-top floating window 12, while the on-top floating window 12 is displayed on the touch-sensitive display 10. The cancel icon 13 is indicative of stopping downloading a media file or stopping pushing a downloaded media file. In an implementation, the cancel icon 13 may be represented by the text "cancel", or may be represented by an icon. Various ways to represent the cancel icon 13 may fall within the protection scope of the present disclosure, as long as the user can clearly know the meaning of "cancel". In this embodiment, the user may trigger the cancel icon 13 through the touch-sensitive display 10, and the processor 20 may stop downloading the media file or stop pushing the downloaded media file in response to the user triggering the cancel icon, so as to control the push of the media file. It may be understood that, after the cancel icon 13 is triggered, the on-top floating window 12 may be reduced to the first size and displayed at the first position of the touch-sensitive display 10, for example, returned to the case shown in FIG. 2.

Figure 7:
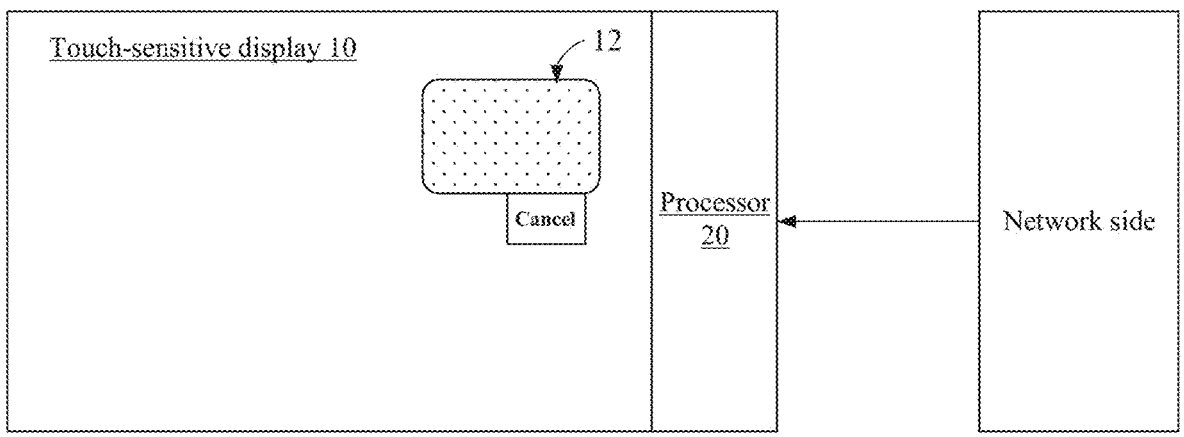
FIG. 7 is a schematic diagram illustrating display of a cancel icon according to another embodiment of the present disclosure.

In an embodiment, the second-level menu and the cancel icon 13 in the second-level menu may not be displayed immediately while the on-top floating window 12 is displayed on the touch-sensitive display 10, but may be displayed when it is detected that the user triggers the on-top floating window 12 through the touch-sensitive display 10. In this case, the cancel icon 13 may be connected to but not overlap with the on-top floating window 12, as shown in FIG. 7. The user may trigger the cancel icon 13 through the touch-sensitive display 10, and the processor 20 may stop downloading the media file or stop pushing the downloaded media file in response to the user triggering the cancel icon, so as to control the push of the media file. It may be understood that, after the cancel icon 13 is triggered, the on-top floating window 12 may be reduced to the first size and displayed at the first position of the touch-sensitive display 10, for example, returned to the case shown in FIG. 2.

Figure 8:
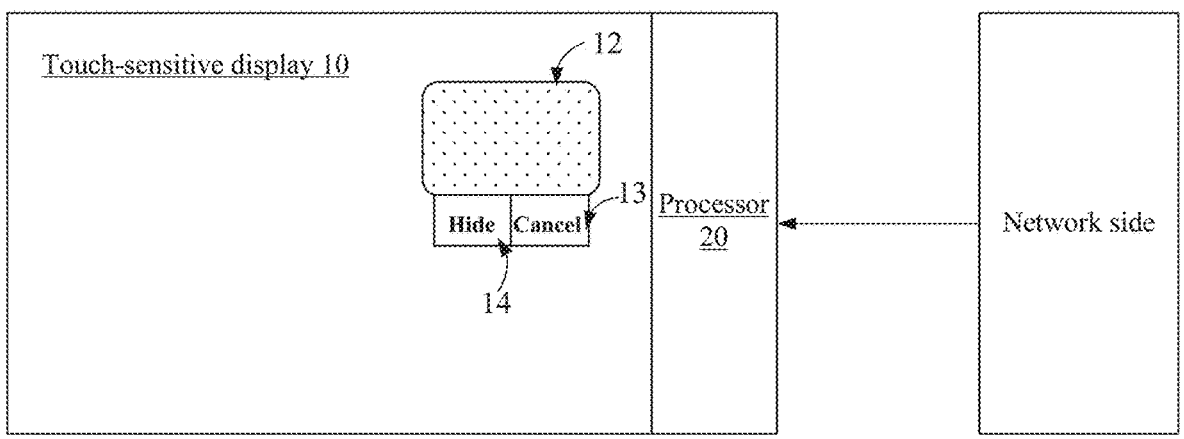
FIG. 8 is a schematic diagram illustrating display of a hide icon according to an embodiment of the present disclosure.

In an embodiment, the on-top floating window 12, when displayed on the touch-sensitive display 10, may cover other display contents, which affects the normal use of the user. In this case, the processor 20 may be further configured to display a hide icon 14 while displaying the cancel icon in the second-level menu of the on-top floating window 12, as shown in FIG. 8. When the hide icon 14 is triggered by the user, the processor 20 may hide the on-top floating window to an edge of a display interface of the touch-sensitive display 10, or adjust the on-top floating window to be transparent (for example, with a transparency of 10%-20%). It may be understood that maintaining a certain transparency may achieve an effect of not covering the display interface (that is, realizing hiding) and facilitating viewing of the on-top floating window 12.

Figure 9:
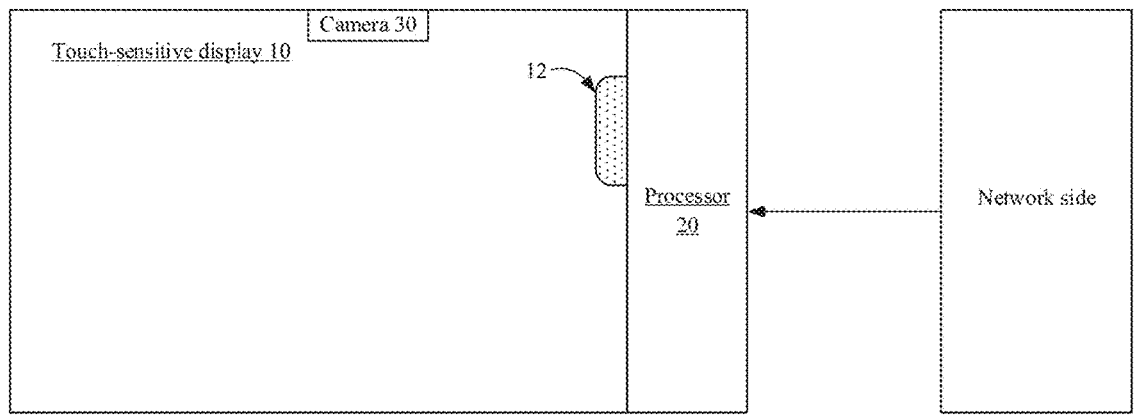
FIG. 9 is a schematic diagram illustrating hiding of an on-top floating window according to an embodiment of the present disclosure.

For ease of understanding, in this embodiment, the hide icon 14 and the cancel icon 13 may be provided in the same manner. For example, the hide icon 14 and the cancel icon 13 may be both provided above the on-top floating window 12 to cover the on-top floating window 12, or both connected to but not overlap with the on-top floating window 12 to be tiled alongside the on-top floating windows 12. The user may trigger the hide icon 14 through the touch-sensitive display 10, and the processor 20 may hide the on-top floating window 12 in response to the user triggering the hide icon 14, as shown in FIG. 9. In an implementation, the user may move the on-top floating window 12 to the edge of the touch-sensitive display 10 through a gesture operation such as a drag operation, which will not be repeated herein. However, the second-level menu may also be hidden through the above hide icon.

In an embodiment, if the touch-sensitive display 10 detects no triggering operation on the on-top floating window 12, the cancel icon 13, or the hide icon 14 by the user within a preset period of time, the processor 20 may determine that the user wants to download the media file, and at this time, the processor 20 may download the media file. Then, after the media file is downloaded, the downloaded media file may be pushed on the touch-sensitive display for display. After the media file is successfully pushed on the display, the on-top floating window 12 in the second size displayed at the second position may be shifted to the first position for display in the first size, that is, returned to the case shown in FIG. 2.

It should be noted that, in an implementation, other function icons such as "pause" icon and "attribute" icon may be further provided in the second-level menu. In the case that there are a larger number of icons in the second-level menu, the second-level menu may be collapsed, for example, the second-level menu may display a plurality of icons in the form of a pull-down menu.

Figure 10:
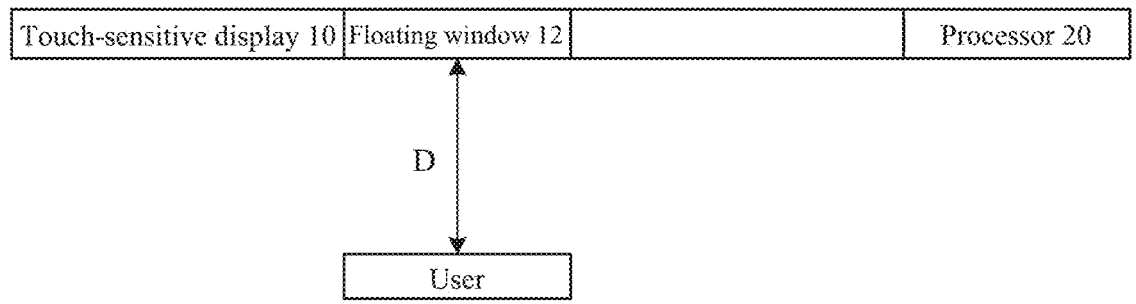
FIG. 10 is a schematic diagram illustrating the minimum distance between an on-top floating window and a user according to an embodiment of the present disclosure.

In an embodiment, considering that the touch-sensitive display 10 of the device for intelligent interaction has a relatively large size, for example, more than 55 inches, when the user uses the device for intelligent interaction, the user and the on-top floating window 12 may be located at the left and right sides of the touch-sensitive display 10, respectively, causing the user unable to view the on-top floating window 12 in time. To this end, the device for intelligent interaction in this embodiment may further include a camera 30, as shown in FIG. 9. The camera 30 may include a binocular camera, a TOF camera or an infrared camera, such that the camera 30 may acquire a user image containing depth information that indicates a distance between the user and the camera. The processor 20 may acquire position information of the user according to the user image uploaded by the camera, and adjust a position of the enlarged on-top floating window 12 with the second size according to the position information, such that a distance between the on-top floating window and the user may be minimized, as shown in FIG. 10 in which a top view is illustrated.

Figure 11:
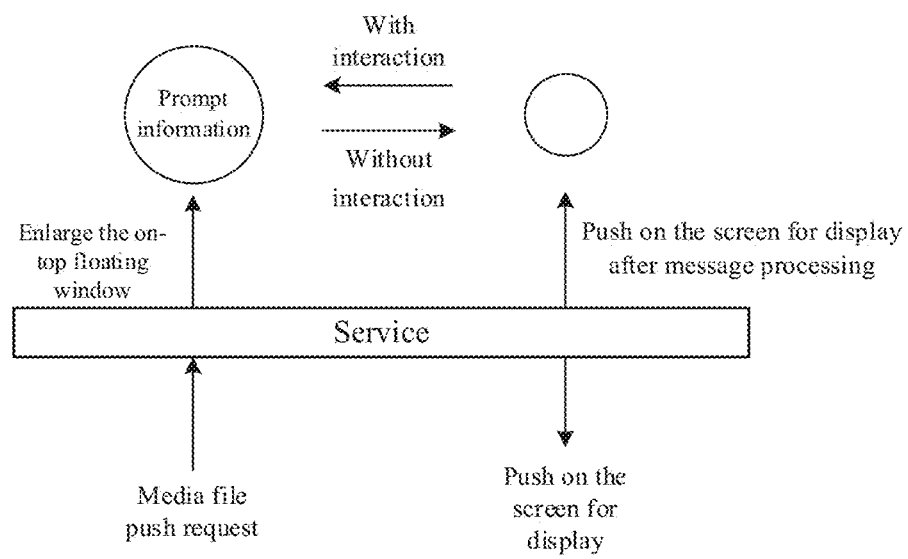
FIG. 11 is a diagram illustrating an application scenario according to an embodiment of the present disclosure.

In conjunction with the above descriptions and with reference to FIG. 11, the present disclosure provides an operation process of the device for intelligent interaction.

Figure 12A:
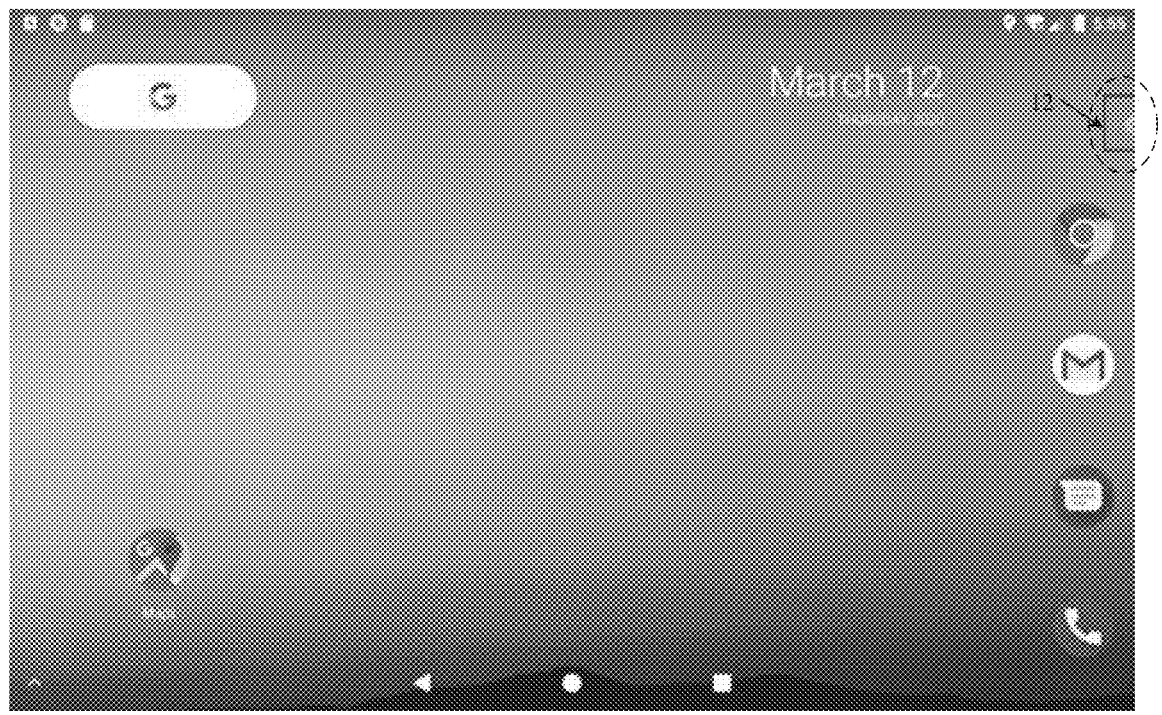
FIGS. 12A and 12B are schematic diagrams illustrating an on-top floating window in the first size displayed at the first position according to an embodiment of the present disclosure, where
Figure 12B:
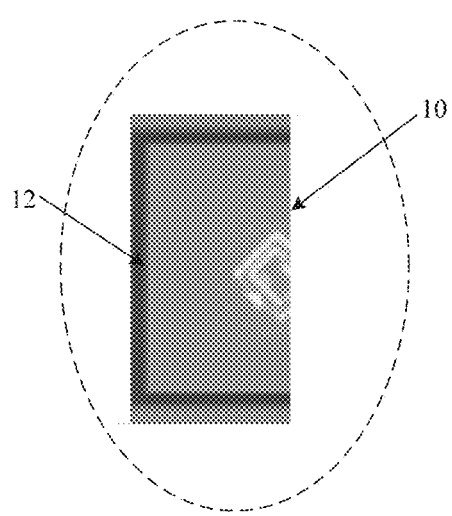

In this example, the device for intelligent interaction may have an Android system pre-installed therein and create a background service. The background service may have functions such as processing a media file transfer message and pushing a media file on a screen (of a touch-sensitive display) for display after the media file is downloaded. After the service is enabled, a permanent floating window (for example, the on-top floating window 12 in the above embodiments) may be created in the service by using WindowManager.addView( ). At this time, the on-top floating window is a first-level menu, and may be displayed at the first position of the touch-sensitive display in the first size, as shown in FIGS. 12A and 12B. FIG. 12A illustrates a display state of the on-top floating window on the touch-sensitive display, and FIG. 12B illustrates an enlarged view of the on-top floating window in FIG. 12A, in which a portion of the on-top floating window is displayed on the display and the other portion is hidden. In the meanwhile, if a user presses on the on-top floating window, the on-top floating window may be enlarged and moved to a specified position.

Figure 13A:
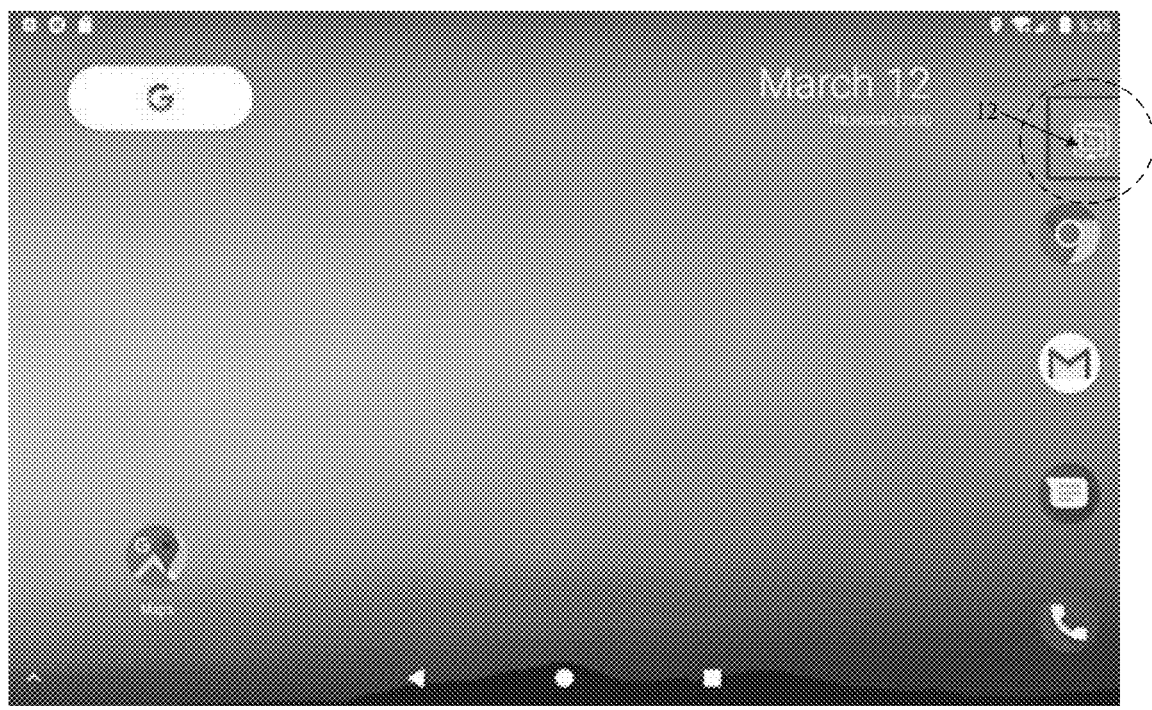
FIGS. 13A and 13B are schematic diagrams illustrating an on-top floating window in the second size displayed at the second position according to an embodiment of the present disclosure, where
Figure 13B:
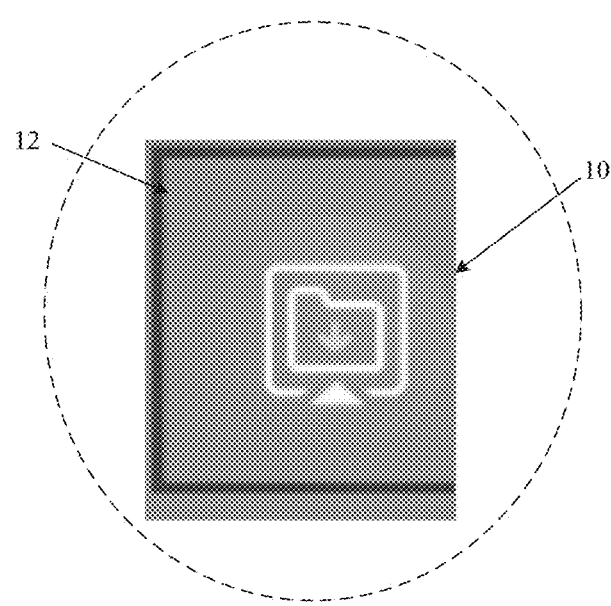

The service, after enabled, may receive the media file transfer message from a network side. Upon receiving the media file transfer message, a layout of the on-top floating window may be changed by using WindowManager.add-View( ). For example, the on-top floating window may be enlarged to the second size and displayed at the second position of the touch-sensitive display, as shown in FIGS. 13A and 13B. FIG. 13A illustrates a state in which the on-top floating window in the second size is displayed at the second position of the touch-sensitive display, and FIG. 13B illustrates an enlarged view of the on-top floating window in FIG. 13A.

Figure 14A:
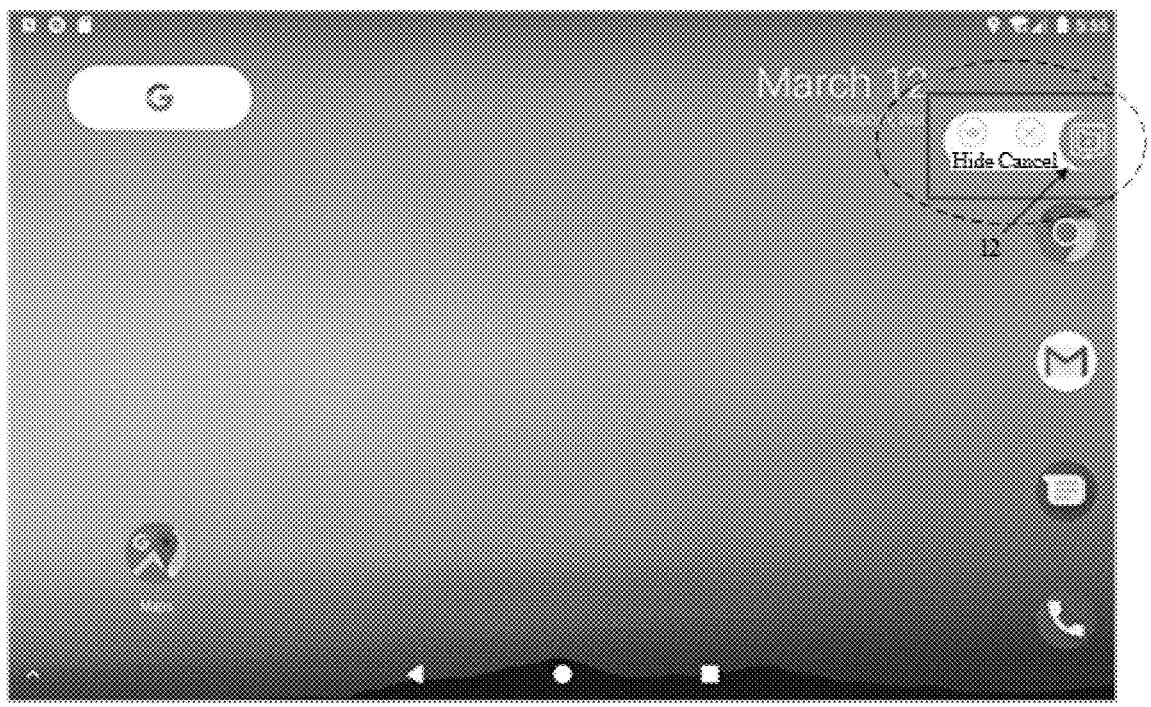
FIGS. 14A and 14B are schematic diagrams illustrating display of a second-level menu of an on-top floating window according to an embodiment of the present disclosure, where
Figure 14B:
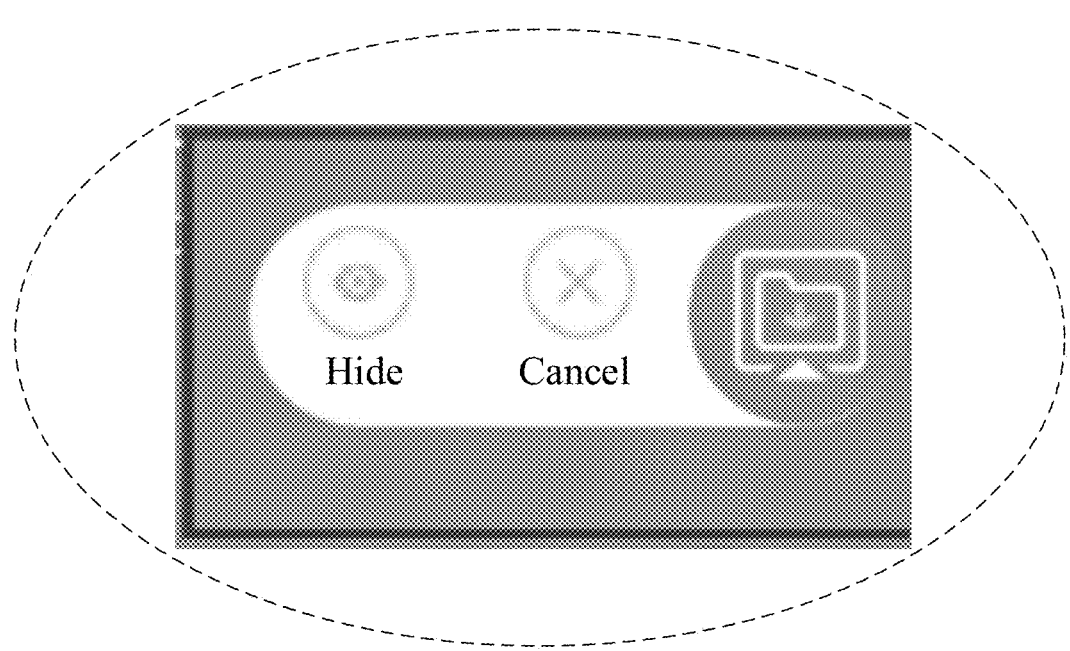

When the user clicks the on-top floating window or the user performs no operation on the on-top floating window for a period of time (such as 5 seconds), a second-level menu may be popped up on the on-top floating window. For example, the second-level menu may include a cancel icon and/or a hide icon, as shown in FIGS. 14A and 14B. FIG. 14A illustrates a state in which the cancel icon and the hide icon in the second-level menu of the on-top floating window are displayed side by side with the on-top floating window, and FIG. 14B illustrates an enlarged view of the on-top floating window, the cancel icon and the hide icon in FIG. 14A.

If the user performs a triggering operation on the on-top floating window through the touch-sensitive display 10, the touch-sensitive display 10 may detect the triggering operation and send the triggering operation to the service, and the service may monitor the triggering operation detected by the touch-sensitive display 10. When the triggering operation is a cancel operation, download of the media file may be stopped. When the triggering operation is a hide operation, the on-top floating window may be hidden at an edge of a display interface of the touch-sensitive display 10, or the on-top floating window may be adjusted to be transparent (for example, with a transparency of 10%-20%). It may be understood that maintaining a certain transparency may achieve an effect of not covering the display interface and facilitating viewing of the on-top floating window.

The service may directly download the media file locally upon receiving the media file transfer message or after a certain time delay (for example, 1-2 seconds). After the media file is downloaded, the on-top floating window may be enlarged to the second size and displayed at the second position of the touch-sensitive display. At this time, prompt information such as file name and file type may be displayed in the on-top floating window. The service may monitor the triggering operation detected by the touch-sensitive display 10. When the triggering operation is the cancel operation, push of the downloaded media file may be stopped. When the triggering operation is the hide operation, the on-top floating window may be hidden at the edge of the display interface of the touch-sensitive display 10, or the on-top floating window may be adjusted to be transparent (for example, with a transparency of 10%-20%).

Figure 15:
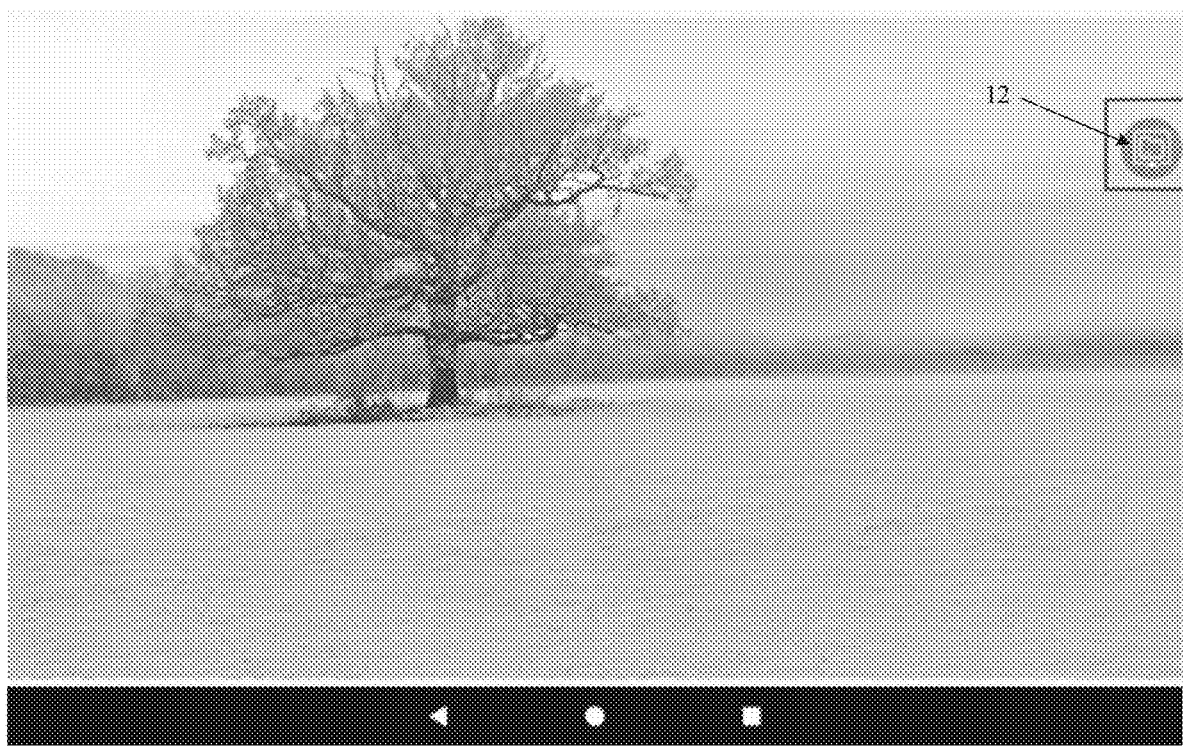
FIG. 15 is a diagram illustrating a display effect after a downloaded media file is pushed on a screen successfully according to an embodiment of the present disclosure, in which an on-top floating window in the second size is displayed at the second position.
Figure 16:
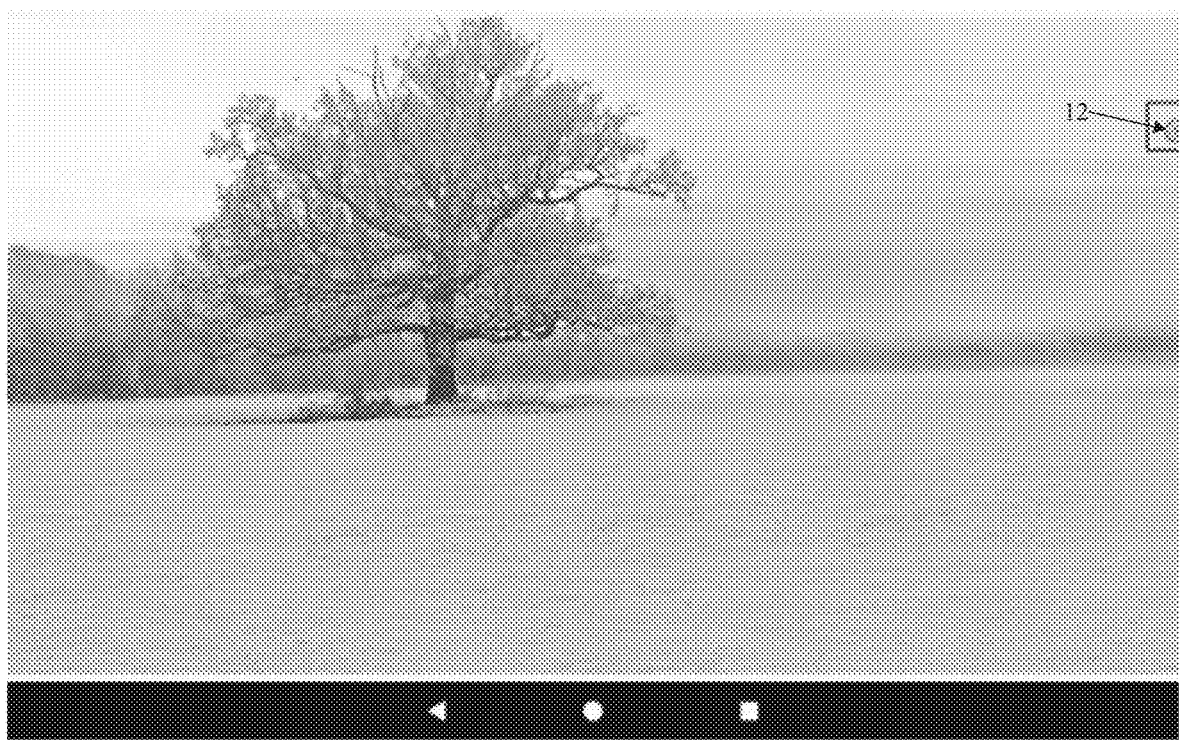
FIG. 16 is a diagram illustrating a display effect after a downloaded media file is pushed on a screen successfully according to an embodiment of the present disclosure, in which an on-top floating window in the first size is displayed at the first position.

When the on-top floating window is in an enlarged state for a preset period of time (for example, 2-10 seconds) and no triggering operation is detected during this period, the processor may download the media file or push the downloaded media file on the display by default, as shown in FIG. 15 which illustrates a case where the media file is a picture and is displayed. After the media file is downloaded or successfully pushed on the display, the processor may restore the on-top floating window to the first size and display it at the first position, as shown in FIG. 16.

Figure 17:
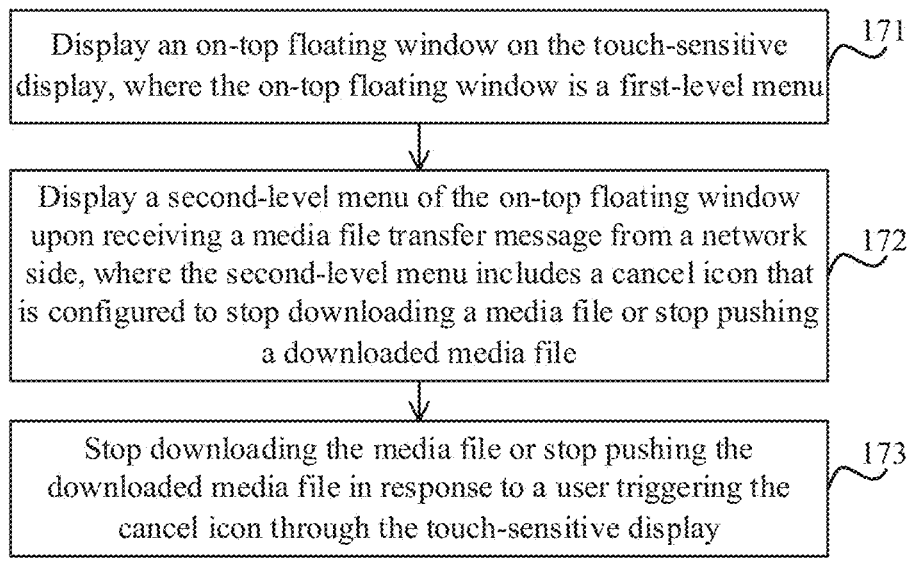
FIG. 17 is a flowchart illustrating a method of intelligent interaction according to an embodiment of the present disclosure.

Based on the above device for intelligent interaction, an embodiment of the present disclosure further provides a method of intelligent interaction, which is executable by a processor in a device for intelligent interaction including a touch-sensitive display. Referring to FIG. 17, the method of intelligent interaction includes steps 171-173.

At step 171, an on-top floating window is displayed on the touch-sensitive display, where the on-top floating window is a first-level menu.

At step 172, a second-level menu of the on-top floating window is displayed upon receiving a media file transfer message from a network side, where the second-level menu includes a cancel icon that is configured to stop downloading a media file or stop pushing a downloaded media file.

At step 173, download of the media file is stopped or push of the downloaded media file is stopped in response to a user triggering the cancel icon through the touch-sensitive display.

In an embodiment, after receiving the media file transfer message from the network side, the method may further include:
detecting a triggering operation on the on-top floating window by the user; and
displaying the second-level menu of the on-top floating window in response to detecting the triggering operation on the on-top floating window by the user.

In an embodiment, the method may further include:
displaying a hide icon while the cancel icon is displayed in the second-level menu of the on-top floating window; and
hiding the second-level menu or hiding the on-top floating window in response to the user triggering the hide icon.

In an embodiment, the method may further include:
displaying the on-top floating window in a second size at a second position of the touch-sensitive display.

In an embodiment, the method may further include:
displaying the on-top floating window in a first size at a first position of the touch-sensitive display, before displaying the on-top floating window in the second size at the second position of the touch-sensitive display.

In an embodiment, the method may further include:
shifting the on-top floating window at the first position to the second position and displaying the on-top floating window in the second size after receiving the media file transfer message and before displaying the cancel icon on the on-top floating window, where the first position is different from the second position, and the first size is smaller than the second size.

In an embodiment, after the on-top floating window in the second size is displayed at the second position of the touch-sensitive display, the method may further include:
displaying prompt information in the on-top floating window in response to the media file being in a downloading state, where the prompt information includes at least one of a file type of the media file corresponding to the media file transfer message, a download progress, a user identification of a pushing user, or network information during download.

In an embodiment, the method may further include:
acquiring position information of the user, and adjusting a position of the on-top floating window in the second size according to the position information of the user, such that a distance between the on-top floating window and the user is minimized.

In an embodiment, the method may further include:
pushing the downloaded media file on the touch-sensitive display for display in response to the user performing no operation on the cancel icon of the on-top floating window; and after the media file is successfully pushed on the display, shifting the on-top floating window in the second size displayed at the second position to the first position for display in the first size.

An embodiment of the present disclosure further provides a non-transitory computer-readable storage medium having a computer executable program stored therein, where the computer executable program, when executed by a processor, causes the processor to perform the above method of intelligent interaction.

In the present disclosure, terms "first" and "second" are only used for descriptive purposes, and cannot be understood as indicating or implying relative importance. Term "a plurality of" refers to two or more, unless specifically defined otherwise. In the present disclosure, two components connected by a dashed line are in an electrical connection or contact relationship, and the dashed line is only used to make the drawings clearer and the solution of the present disclosure easier to understand.

Those skilled in the art will easily conceive of other embodiments of the present disclosure after considering the specification and practicing the disclosure disclosed herein. The present disclosure is intended to cover any variations, uses or adaptive changes of the present disclosure. These variations, uses or adaptive changes follow the general principles of the present disclosure and include common knowledge or conventional technical means in the art that are not disclosed by the present disclosure. The specification and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes may be made without departing from the scope thereof. The scope of the present disclosure is only limited by the appended claims.

The invention claimed is:

1. A device for intelligent interaction, comprising a touch-sensitive display, and a processor coupled to the touch-sensitive display and configured to:
   display a permanent on-top floating window in an initial display state on the touch-sensitive display upon the device for intelligent interaction is powered on, wherein the on-top floating window is a first-level menu;
   enlarge the on-top floating window upon receiving a media file transfer message from a network side;
   display a second-level menu of the on-top floating window in response to a user triggering the on-top floating window, wherein the second-level menu comprises a cancel icon that is configured to stop downloading a media file or stop pushing a downloaded media file;
   stop downloading the media file in response to the user triggering the cancel icon through the touch-sensitive display while downloading the media file, or stop pushing the downloaded media file in response to the user triggering the cancel icon through the touch-sensitive display while pushing the downloaded media file; and
   download the media file in response to the user performing no operation on the cancel icon while downloading the media file, or push the downloaded media file on the touch-sensitive display for display in response to the user performing no operation on the cancel icon while pushing the downloaded media file; and return the enlarged on-top floating window to the initial display state upon pushing the downloaded media file on the touch-sensitive display for display.

2. The device according to claim 1, wherein the second-level menu further comprises a hide icon, and
   the processor is further configured to display the hide icon while the cancel icon is displayed in the second-level menu of the on-top floating window, and to hide the second-level menu or hide the on-top floating window in response to the user triggering the hide icon.

3. The device according to claim 1, wherein the processor is further configured to display the on-top floating window in a second size at a second position of the touch-sensitive display.

4. The device according to claim 3, wherein the processor is further configured to display the on-top floating window in a first size at a first position of the touch-sensitive display, before displaying the on-top floating window in the second size at the second position of the touch-sensitive display.

5. The device according to claim 4, wherein the processor is further configured to shift the on-top floating window at the first position to the second position and display the on-top floating window in the second size after receiving the media file transfer message and before displaying the cancel icon on the on-top floating window, and
   wherein the first position is different from the second position, and the first size is smaller than the second size.

6. The device according to claim 4, wherein the processor is further configured to shift the on-top floating window in the second size displayed at the second position to the first position for display in the first size upon pushing the downloaded media file on the touch-sensitive display for display, in response to the user performing no operation on the cancel icon while pushing the downloaded media file.

7. The device according to claim 3, wherein the processor is further configured to display prompt information in the on-top floating window in response to the media file being in a downloading state, after the on-top floating window in the second size is displayed at the second position of the touch-sensitive display, and
   wherein the prompt information comprises at least one of a file type of the media file, a download progress, a user identification of a pushing user, or network information during download.

8. The device according to claim 3, further comprising a camera configured to acquire an image of the user containing depth information that indicates a distance between the user and the camera, wherein the processor is further configured to acquire position information of the user according to the image of the user containing the depth information, and to adjust a position of the on-top floating window in the second size according to the position information, such that a distance between the on-top floating window and the user is minimized.

9. The device according to claim 1, wherein the processor is further configured to return the enlarged on-top floating window to the initial display state after the cancel icon is triggered.

10. A method of intelligent interaction, which is executable by a processor in a device for intelligent interaction comprising a touch-sensitive display, the method comprising:
    displaying a permanent on-top floating window in an initial display state on the touch-sensitive display upon the device for intelligent interaction is powered on, wherein the on-top floating window is a first-level menu;
    enlarging the on-top floating window upon receiving a media file transfer message from a network side;
    detecting a triggering operation on the on-top floating window by a user;
    displaying a second-level menu of the on-top floating window in response to detecting the triggering operation on the on-top floating window by the user, wherein the second-level menu comprises a cancel icon that is configured to stop downloading a media file or stop pushing a downloaded media file;
    stopping downloading the media file in response to the user triggering the cancel icon through the touch-sensitive display while downloading the media file, or stopping pushing the downloaded media file in response to the user triggering the cancel icon through the touch-sensitive display while pushing the downloaded media file; and downloading the media file in response to the user performing no operation on the cancel icon while downloading the media file, or pushing the downloaded media file on the touch-sensitive display for display in response to the user performing no operation on the cancel icon while pushing the downloaded media file; and returning the enlarged on-top floating window to the initial display state upon pushing the downloaded media file on the touch-sensitive display for display.

11. The method according to claim 10, wherein the second-level menu further comprises a hide icon, and
the method further comprising:
displaying the hide icon while the cancel icon is displayed in the second-level menu of the on-top floating window; and
hiding the second-level menu or hiding the on-top floating window in response to the user triggering the hide icon.

12. The method according to claim 10, further comprising:
displaying the on-top floating window in a second size at a second position of the touch-sensitive display.

13. The method according to claim 12, further comprising:
displaying the on-top floating window in a first size at a first position of the touch-sensitive display, before displaying the on-top floating window in the second size at the second position of the touch-sensitive display.

14. The method according to claim 13, further comprising:
shifting the on-top floating window at the first position to the second position and displaying the on-top floating window in the second size after receiving the media file transfer message and before displaying the cancel icon on the on-top floating window, and
wherein the first position is different from the second position, and the first size is smaller than the second size.

15. The method according to claim 13, further comprising:
shifting the on-top floating window in the second size displayed at the second position to the first position for display in the first size upon pushing the downloaded media file on the touch-sensitive display for display, in response to the user performing no operation on the cancel icon while pushing the downloaded media file.

16. The method according to claim 12, wherein after the on-top floating window in the second size is displayed at the second position of the touch-sensitive display, the method further comprises:
displaying prompt information in the on-top floating window in response to the media file being in a downloading state, and
wherein the prompt information comprises at least one of a file type of the media file, a download progress, a user identification of a pushing user, or network information during download.

17. The method according to claim 12, wherein the device for intelligent interaction further comprises a camera configured to acquire an image of the user containing depth information that indicates a distance between the user and the camera, and the method further comprises:
acquiring position information of the user according to the image of the user containing the depth information, and adjusting a position of the on-top floating window in the second size according to the position information, such that a distance between the on-top floating window and the user is minimized.

18. The method according to claim 10, further comprising:
returning the enlarged on-top floating window to the initial display state after the cancel icon is triggered.

19. A non-transitory computer-readable storage medium having a computer executable program stored therein, wherein the computer executable program, when executed by a processor in a device for intelligent interaction comprising a touch-sensitive display, causes the processor to perform operations comprising:
displaying a permanent on-top floating window in an initial display state on the touch-sensitive display upon the device for intelligent interaction is powered on, wherein the on-top floating window is a first-level menu;
enlarging the on-top floating window upon receiving a media file transfer message from a network side;
detecting a triggering operation on the on-top floating window by a user;
displaying a second-level menu of the on-top floating window in response to detecting the triggering operation on the on-top floating window by the user, wherein the second-level menu comprises a cancel icon that is configured to stop downloading a media file or stop pushing a downloaded media file;
stopping downloading the media file in response to the user triggering the cancel icon through the touch-sensitive display while downloading the media file, or stopping pushing the downloaded media file in response to the user triggering the cancel icon through the touch-sensitive display while pushing the downloaded media file; and
downloading the media file in response to the user performing no operation on the cancel icon while downloading the media file, or pushing the downloaded media file on the touch-sensitive display for display in response to the user performing no operation on the cancel icon while pushing the downloaded media file; and returning the enlarged on-top floating window to the initial display state upon pushing the downloaded media file on the touch-sensitive display for display.

* * * * *